(12) United States Patent
Walacavage et al.

(10) Patent No.: US 6,748,283 B2
(45) Date of Patent: Jun. 8, 2004

(54) METHOD OF USING NEUTRAL EVENT SPECIFICATION FILE FOR MANUFACTURING LINE ANALYSIS

(75) Inventors: Joseph G. Walacavage, Ypsilanti, MI (US); Alan Newton Baumgartner, Livonia, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 10/219,712

(22) Filed: Aug. 15, 2002

(65) Prior Publication Data

US 2003/0018405 A1 Jan. 23, 2003

Related U.S. Application Data

(63) Continuation-in-part of application No. 09/681,780, filed on Jun. 4, 2001.
(60) Provisional application No. 60/236,965, filed on Sep. 29, 2000.

(51) Int. Cl.[7] .............................................. G06F 19/00
(52) U.S. Cl. ............................ 700/96; 700/97; 700/99; 700/105
(58) Field of Search .............................. 700/96, 97, 99

(56) References Cited

U.S. PATENT DOCUMENTS

| | | | |
|---|---|---|---|
| 4,928,221 A | 5/1990 | Belkhiter | 364/191 |
| 4,931,951 A | 6/1990 | Murai et al. | 364/513 |
| 4,998,206 A | 3/1991 | Jones et al. | 364/468 |
| 5,050,088 A * | 9/1991 | Buckler et al. | 700/96 |
| 5,249,135 A | 9/1993 | Fujita | 364/474.21 |
| 5,377,116 A | 12/1994 | Wayne et al. | 364/474.17 |
| 5,377,315 A | 12/1994 | Leggett | 395/140 |
| 5,388,051 A | 2/1995 | Seki et al. | 364/474.11 |
| 5,402,349 A | 3/1995 | Fujita et al. | 364/468 |
| 5,574,637 A | 11/1996 | Obata et al. | 364/131 |
| 5,644,493 A | 7/1997 | Motai et al. | 364/468.02 |
| 5,796,618 A | 8/1998 | Maeda et al. | 364/474.24 |
| 5,963,447 A | 10/1999 | Kohn et al. | 364/148.04 |
| 6,167,406 A | 12/2000 | Hoskins et al. | 707/102 |
| 6,185,469 B1 * | 2/2001 | Lewis et al. | 700/99 |
| 6,223,134 B1 | 4/2001 | Rust et al. | 702/121 |
| 6,263,487 B1 | 7/2001 | Stripf et al. | 717/1 |
| 6,292,707 B1 * | 9/2001 | Hair et al. | 700/97 |

FOREIGN PATENT DOCUMENTS

EP        0 508 308 A3     4/1992

* cited by examiner

*Primary Examiner*—Leo Picard
*Assistant Examiner*—Carlos R. Ortiz
(74) *Attorney, Agent, or Firm*—David B. Kelley

(57) ABSTRACT

A method is provided of using a neutral event specification file for manufacturing line analysis. The method includes the steps of constructing a neutral event specification file having a specification format including at least one event, wherein each event has a name, description, at least one signal, and at least one action. The method also includes the step of executing a manufacturing line analysis model using the neutral event specification file.

20 Claims, 1 Drawing Sheet

US 6,748,283 B2

METHOD OF USING NEUTRAL EVENT SPECIFICATION FILE FOR MANUFACTURING LINE ANALYSIS

CROSS-REFERENCE TO A RELATED APPLICATION

The present application is a continuation-in-part of U.S. patent application Ser. No. 09/681,780, filed Jun. 4, 2001, which claims benefit of Ser. No. 60/236,965 filed Sep. 29, 2000.

BACKGROUND OF THE INVENTION

1. Field of the Invention

The present invention relates generally to programmable logic controllers and, more specifically, to a method of using a neutral event specification file for manufacturing line analysis for manufacturing a motor vehicle.

2. Description of the Related Art

It is known that programmable logic controller (PLC) code is written by controls engineers after assembly tooling designs are completed and a manufacturing process has been defined. The creation of the programmable logic controller code is mostly a manual programming task with any automation of the code generation limited to "cutting and pasting" previously written blocks of code that were applied to similar manufacturing tools. Once the programmable logic controller code is written, it is used by a programmable logic controller to build subsequent hard tools used in the manufacture of parts for motor vehicles. The programmable logic controller code is not validated (debugged) until the hard tools are built and tried. A significant portion of this tool tryout process is associated with the debugging of the programmable logic controller code at levels of detail from a tool-by-tool level, to a workcell level and finally at a manufacturing line level.

It is also known that a manufacturing line is typically made of three to twenty linked workcells. Each workcell consists of a tool such as a fixture to position a product, for example sheet metal, and associated automation, for example robots, that process the product, for example by welding. The workcell typically consists of a fixture/tool surrounded by three or four robots. The product is then transferred to the next workcell in the manufacturing line for further processing, until it exits the manufacturing line.

It is further known that the workcells for a manufacturing line can be modeled before the manufacturing line is implemented. Current modeling technologies, such as Robcad from Tecnomatix and Igrip from Delmia, for the manufacturing process are limited in scope to a workcell level, due to how these type of technologies represent and manipulate three dimensional data and tool motions. This scope limitation is due to the manner in which tooling geometry is defined and the manner in which tool motions are described and displayed to a user. The geometry representation is typically defined using Non-Uniform Rational BSpline (NURB) type equations, which are very exact and precise, but require intensive microprocessor calculations. The tooling and robotic motions are also microprocessor intensive in that the articulations and movements are described through the use of complex kinematic equations and solvers. Presently, there is no mechanism to verify that the planned interactions between linked workcells is indeed feasible until the manufacturing line is actually fabricated and assembled on a floor of a manufacturing plant.

Therefore, it is desirable to represent tooling space, tooling motions, and product information and transfer to enable integration and coordination into a manufacturing line for analysis prior to tool fabrication, assembly, and tryout. It is also desirable to provide a neutral event specification file which is not specific to any manufacturing tooling design or process planning system that contains a description of interlocked events which define the required dependencies, actions, and signals that are associated with sequencing and cycling manufacturing tooling devices. It is further desirable to provide a method that uses a neutral event specification file to enable collecting, locating, and event integration of independently defined tooling and workcell modeling for manufacturing line analysis. Therefore, there is a need in the art to provide a method of using a neutral event specification file for manufacturing line analysis for manufacturing a motor vehicle.

SUMMARY OF THE INVENTION

Accordingly, the present invention is a method of using a neutral event specification file for manufacturing line analysis. The method includes the steps of constructing a neutral event specification file having a specification format comprising at least one event, wherein each event has a name, description, at least one signal, and at least one action. The method also includes the step of executing a manufacturing line analysis model using the neutral event specification file.

One advantage of the present invention is that a method of using a neutral event specification file for a manufacturing line analysis is provided for use in building a manufacturing line to manufacture a motor vehicle. Another advantage of the present invention is that the method uses a neutral event specification file that enables integration of multiple and independently defined three dimensional CAD tooling, fixture, workcell, and product design models into a single and comprehensive total manufacturing line analysis model. Yet another advantage of the present invention is that the method enables analysis for entire manufacturing lines within one single modeling environment, prior to tooling fabrication and tryout of the actual manufacturing line. Still another advantage of the present invention is that the method provides significant reduction in programmable logic controller coding, workcell level PLC debugging, and manufacturing line level PLC debugging that is normally associated with the manufacturing line tryout procedure. A further advantage of the present invention is that the method brings together all the three dimensional product data, three dimensional tooling design data, tooling motions/behaviors, and interactions between tools and product data associated with an entire manufacturing line. Yet a further advantage of the present invention is that the method provides for pre-build verification of workcell to workcell interactions and total manufacturing line operation, so that any necessary adjustments or changes in tool design can be made while the manufacturing line is still in "design state", rather than the current practice of not being able to test for workcell to workcell interaction issues until tool build and manufacturing line tryout.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
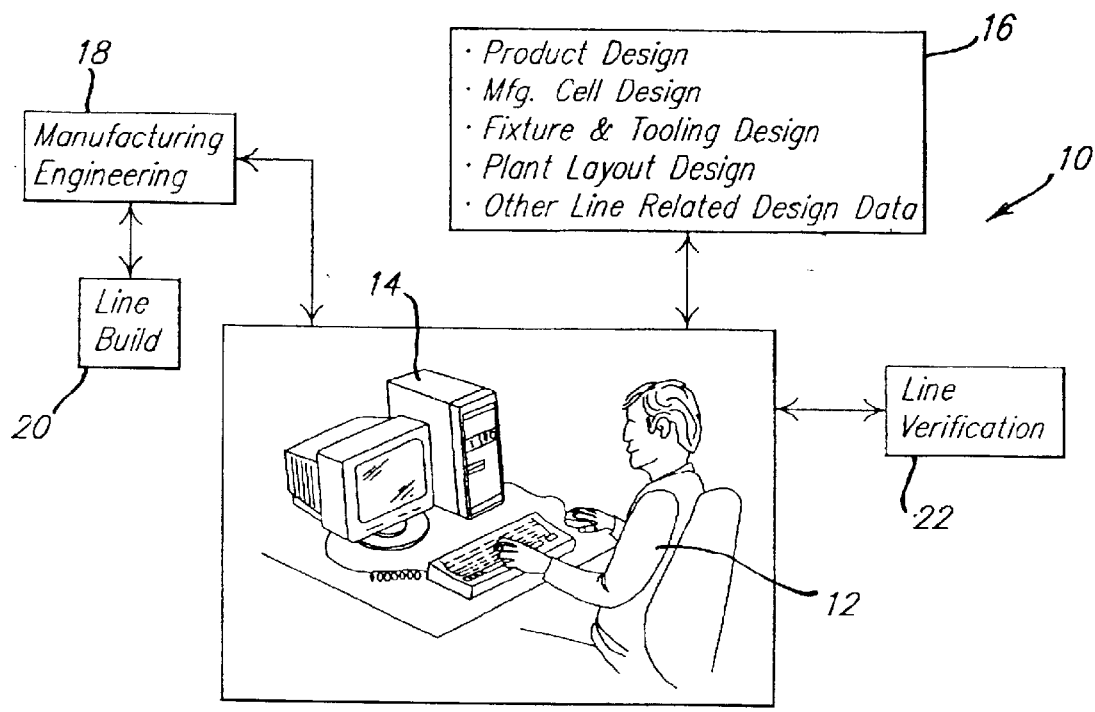
FIG. 1 is a diagrammatic view of a system, according to the present invention, for using a neutral event specification file for manufacturing line analysis illustrated in operational relationship with an operator.

Referring to the drawings and in particular FIG. 1, one embodiment of a system 10, according to the present invention, for using a neutral event specification file for manufacturing line analysis is illustrated. In the present invention, an operator 12 uses the system 10 to perform the manufacturing line analysis. The system 12 includes a computer 14 to send and receive information to and from a design engineering source 16 via an electronic link. The design engineering source 16 includes a product design system, manufacturing cell design system, fixture and tooling design system, plant layout design system, and other manufacturing line related design systems to provide engineering data for standard components, tools, fixture models, and robots to interact with the fixture models. These design systems have the ability to read and write in the neutral event specification file format, in this embodiment, named VLE. For example, the operator 12 may use the workcell design system to write to a neutral control model or event specification file for workcell models, incorporating information from the neutral event specification file from the fixture design system. Specifically, if a fixturing station has robots or flexible automation involved, the workcell design system will import the fixture and processing data defined in the neutral event specification file from the fixture design system, allowing the user to add robots to interact with the fixture and other tooling such as clamps. It should be appreciated that several neutral event specification files may be written by the systems of the design engineering source 16.

The computer 14 also sends and receives information to and from a manufacturing engineering source 18 via an electronic link. The manufacturing engineering source 18 includes data on manufacturing engineering such as a tooling line. The manufacturing engineering source 18 also sends and receives information to and from a manufacturing line build source 20 via an electronic link. The manufacturing line build source 20 includes data for building the manufacturing line (not shown) for the manufacture of parts (not shown) for a motor vehicle (not shown). The computer 14 also sends and receives information from a manufacturing line verification source 22 via an electronic link. The manufacturing line verification source 22 verifies the workcell to workcell interactions and total manufacturing line operation. The manufacturing line build source 20 automatically generates the programmable logic controller (PLC) code, which is then used at physical tool build. An example of automatically generating PLC code for building a physical tool is disclosed in copending application Ser. No. 09/312,499, filed May 17, 1999, the disclosure of which is hereby incorporated by reference. It should be appreciated that the computer 12, electronic links, and sources are conventional and known in the art.

Figure 2:
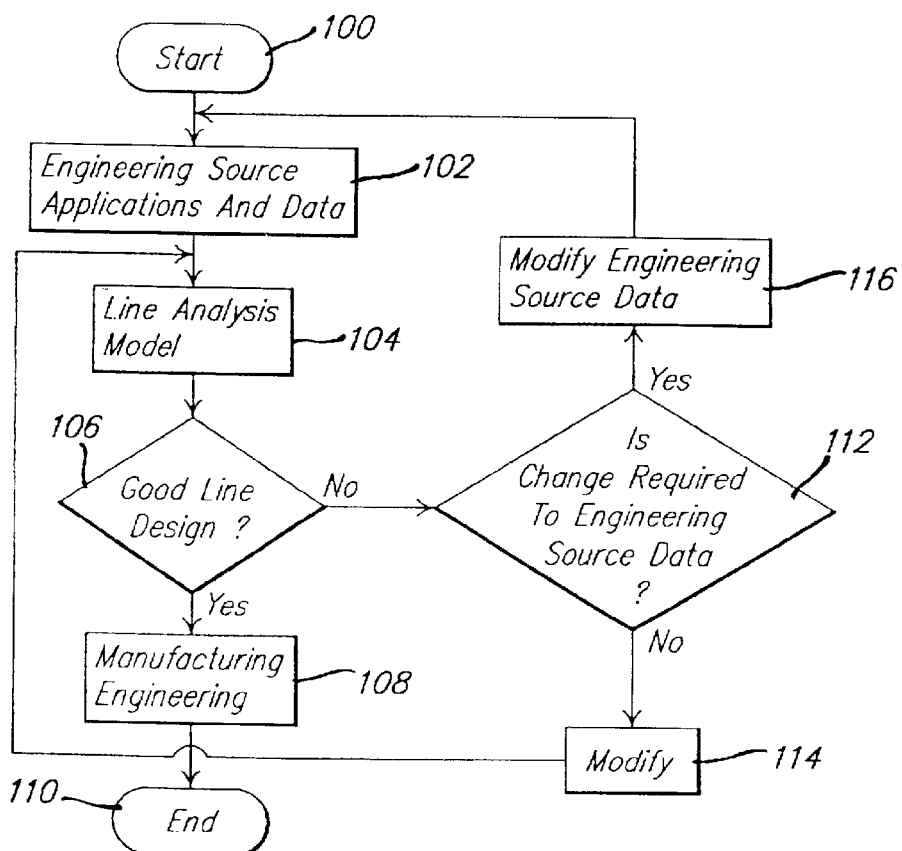
FIG. 2 is a flowchart of a method, according to the present invention, of using a neutral event specification file for manufacturing line analysis for the system of FIG. 1.

Referring to FIG. 2, a method, according to the present invention, of using a neutral event specification file for manufacturing line analysis with the system 10 is shown. In general, the method constructs a neutral event specification file, converts the neutral event specification file into a compatible PLC code and analytically verifies the PLC code. It should be appreciated that the method is carried out on the computer 14 of the system 10 by the operator 12.

The neutral event specification file is a neutral file that contains an event specification format to enable collecting, locating, and event integration of independently defined tooling and workcell models. In general, a model is typically some representation of critical elements of a real entity. As used herein, the neutral event specification file is a representation of the critical elements required to control manufacturing tooling. This term "neutral" is meaningful in that the event specification file used in this process is not specific to any one manufacturing tooling design or process planning system. The neutral event specification file contains a description of interlocked events (sometimes referred to as networked event), which define the required dependencies, actions, and signals that are associated with sequencing and cycling manufacturing tooling devices. For example, in constructing a vehicle body (not shown) of the motor vehicle, the event specification file would have individual events that describe when the conditions were correct for a clamp to open or close. It should be appreciated that event specification information from the neutral event specification file can be readily passed from one manufacturing design system to another as long as all the tool design systems can interpret the neutral event specification file format, in this embodiment, named VisLine Event (VLE) file.

The VLE file defines a series of events that can be played in the VisLine visualization environment. The events define an action or actions that occur when it is activated and a structure of signals and dependencies to trigger the execution of events. The VLE file is a structured ASCII file that contains descriptions for one or more events. The order of events within the file is not relevant as one or more VLE files may be parsed and read into memory of the computer 14 at one time. It should be appreciated that only after all event descriptions are read are the events processed.

In the VLE file, events contain the following information:

| Name | Unique name for the event |
|---|---|
| Description | Text description of what the event does |
| Dependency | None to a plurality dependencies that must be met before the event will be activated. |
| Signals | Signals that can be set by the event that trigger dependencies in other events. Each event defines a STARTED and DONE signal and may set other custom signals. |
| Actions | One or more actions that may be performed by the event when it executes. |
| Child Events | Other events that are children of the current event. Allows events to be organized in a hierarchical manner. |

The syntax of the event block is shown below:

```
Event {
    Name = <name>
        [Description = <strings>]
        [Dependency = <Dependency string>]
        [Signals = <
            <Signal name> <Boolean>
```

-continued

```
    >]
    [Action = <Action Block>]
    [ChildEvent = <Event>]
}
```

Name

This is a string containing the event name and must be unique across all VLE files that are loaded at a given time.

Description

This is a text description of the event used purely for documentation purposes.

Signals

Signals define flags that may be set by the event to notify another event that something has happened. A signal must have a unique name within an event and define an initial value of True or False. Each event has two predefined signals: STARTED and DONE. The STARTED signal is set whenever the event is activated and the DONE signal is set when the event completes. These signals do not need to be defined but assumed to be part of every event.

When custom signals are defined using the Signals block, they must include an initial value. This block then simply defines the initial state of the defined signal, but no notifications are actually sent to other events until the signal is specifically set by another mechanism.

Dependency String

This is a string that defines what dependencies must be met before the event will be activated. A dependency consists of a signal name in the form [!] EventName: Signal Name, where the ! indicates a value of False. Thus, an event might have a dependency on a positive signal in another event with a dependency line as follows:

Dependency="Event1:DONE"

This would indicate that the event would not be started until the DONE signal was set to True in Event1. Correspondingly, an event could have a dependency on a signal in an event being false with the following syntax:

Dependency="!Event1:CUSTOM_1"

This would indicate that the event will not be activated until the signal CUSTOM_1 in Event1 is set to False.

It is also possible to have a complex dependency expression containing a combination of signals joined by AND, OR, and NOT operators along with parenthesis for precedence. An example is shown below:

Dependency="(Event1:DONE & !Event2:STARTED) Event3:DONE

This dependency string would evaluate to true when: (Event1 is DONE AND Event2 is NOT STARTED) OR (Event3 is DONE). The operators are:

| & | AND |
| | | OR |
| ! | NOT |
| ( ) | PRECEDENCE |

Action

An action block defines what actions are to take place when an event is activated. Examples include playing a VFM motion file, loading some geometry, moving some geometry, etc. Events generally have a single action, though it is possible to include more that one action block within an event. These events would then be executed concurrently when the event executes.

Child Event

A child event defines another event, which is constructed as a child of the event where it is specified. This allows events to be organized in a hierarhical manner and allows signals to be scoped for a particular tree of events. For example, a signal name "Signal1" with no qualifying event name would reference the signal in the parent event. A signal name "::Signal1" would refer to Signal1 in the event's parent's parent, etc.

EXAMPLE

```
Event }
    // Event Name is Event6
    Name = "Event6"
    Description = "Open the spool and turn on the spool
    assembly"
    // Event6 will not start until Event4 is DONE
    Dependency = "Event4:DONE"
    // Event6 defines two custom signals, CUSTOM_1 and
    CUSTOM_2 both of which have an initial value of false.
    //Also, events by default always define two standard
    signals, STARTED and DONE which are initially both
    false when the event is created.
    Signals = <
            "CUSTOM_1"    false
            "CUSTOM_2"    false
    >
    // This event also contains an Action block to play a VFM
    file. Action blocks are defined in the following
    sections. Action = MovieAction {File = "reel-open-
    spool.vfm"
    Duration = 4.0
    // Below is a nested child event that is dependent on a
    signal being set in its parent.
    ChildEvent = Event {Name = "ChildEvent1"
    Description = "Child of Event6"
    // This event is dependent on its parents signal
    "CUSTOM_1" being set to true.
    Dependency = ":CUSTOM_1"
    Action = MovieAction {
    Fle = "reel_close_spool.vfm"
    Duration = 4.0
    }
}
```

Action Blocks

An action block is a block within an event that defines that action that is to be taken when that event is activated. Each type of action and is defined below:

Movie Action

Plays the contents of a VFM file over a specified duration in seconds.

Signal Timing Action

A Signal Timing Action is used to fire custom signals in an event at predefined intervals. This allows an event to set a signal to some value after it has been executing for some amount of time.

Visibility Action

The Visibility Action is used to set the visibility of parts or assemblies within the view.

Linear Extraction Action

The Linear Extraction Action defines a path that a part or assembly should move along and then shows the part/assembly moving along that path over the specified duration.

Camera Action

The Camera action is used to position the camera to show alternate viewpoints of the scene.

The method starts or begins in bubble 100 and advances to block 102. In block 102, the method receives information from engineering source applications and data such as the design engineering source 16. The engineering source applications and data may include product design, manufacturing cell design, fixture and tooling design, plant layout design, and other manufacturing line related design data. The product design information may be a single part or a plurality of parts to be assembled in a manufacturing line. The manufacturing cell design information typically includes flexible automation, for example robots, material handling, etc. The fixture and tooling design information typically includes hard tooling such as a clamp. The plant layout design information typically includes location of the manufacturing line, for example location of columns, aisles, etc. The other manufacturing line design information typically includes intersection points of other manufacturing lines (where two manufacturing lines merge), location of control panels, remote valving stations, energy cabinets, and other items that take up space that potentially could interfere with tool movements and operator interactions. The operator 12 uses the computer 14 to construct neutral event specification files for a single tool or cell sequence, geometry files, and tooling behavior motion files from the engineering source applications and data in block 102.

After block 102, the method advances to block 104 and executes a manufacturing line analysis model. The manufacturing line analysis model receives at least one neutral event specification file, geometry file, and tooling behavior or motion file. The neutral event specification file contains information in a neutral event specification file format to enable both integration and coordination of the independently defined tooling and workcell models. The neutral event specification file may be a single tool or workcell sequence for a standard component, tool and fixture models by the fixture design system. For example, the fixture design system has the ability to read and write in the VLE. Specifically, the fixture design system can create a neutral event specification file definition that describes how four clamps need to be sequenced along with a hard-tooled welder. The geometry file contains information of tessellated three-dimensional geometry to represent tooling space. Tessellation is the converting of very precise non-uniform relational boundary equations (partial and differential equations) into polygonal data (triangles, bricks, rectangles), which are less computationally intensive for a microprocessor of the computer 14 to generate and manipulate. The motion file contains information of transformational positional arrays to represent tooling motions and allowed tooling behavior. For example, a single pivot point clamp has only two allowed behaviors, when it rotates from an open position to a closed position when instructed, and then rotates from its closed position to its open position when instructed. In this example, there are two events, one for each allowed tooling motion or behavior. The motion files capture the allowed tooling behavior in transformational positional arrays and the use of a neutral event specification for integration of data and tooling behavior. The motion files use transformational positional arrays to capture in 4 by 4 arrays the position and orientation in three-dimensional space over given time intervals that the tessellated geometry of the tooling is being operated through in a form that is significantly less computationally intensive than the use of kinematic equations. It should be appreciated that the neutral event specification file information that describes events, dependencies, and logical conditions that are used to drive a manufacturing line model to be described.

In block 104, the manufacturing line analysis model collects multiple independently defined manufacturing line data such as three dimensional digital data (geometry files), tooling behaviors (motion files), and tooling sequence (neutral event file). The manufacturing line analysis model organizes the manufacturing line and executes the manufacturing line such as location of fixtures, tooling, workcells, product transfer through manufacturing line, workcell to workcell integration, and total manufacturing line integration. The manufacturing line analysis model verifies the manufacturing line such as line capability to design criteria, product to manufacturing line compatibility, manufacturing line optimization relative to part flow, and manufacturing line fit to manufacturing plant layout. The method reads and manages the entire neutral event specification files required to model a manufacturing line by the line verification system 22. The line verification system 22 has the ability to read in the VLE files. The line verification system 22 also has the ability to manage large amounts of computer aided drafting (CAD) data. The method writes a manufacturing line model file by the line verification system 22 to "logically link" the workcells into a manufacturing line. The line verification system 22 has the ability to write in VLE that enables logical linking the neutral event specification files, geometry files, and motion files. The method plays a manufacturing line model by the line verification system 22, which is driven by the control model described within the manufacturing line model file. It should be appreciated that the line verification system 22 is predominately a collector of data and a viewing tool, not a creator of data.

From block 104, the method advances to diamond 106 and determines whether a good manufacturing line model exists by the operator 12. For example, the operator 12 determines whether there is interference between a clamp moving and the location of a column of the manufacturing plant. If a good manufacturing line model exists, the method advances to block 108 and the manufacturing line model is verified and manufacturing engineering proceeds with the build of the manufacturing line. In one embodiment, if a good manufacturing line exists, the manufacturing line model uses a "virtual programmable logic controller" code generator to automatically generate the PLC code with the virtual PLC code generator from the manufacturing line model. The virtual PLC code generator will create PLC code (with diagnostics) from a VLE file. As previously described, the manufacturing line model will only contain information that is critical to describing how the tooling should operate "as designed" or "as expected" conditions, sometimes referred to as straight sequence cycling. It should be appreciated that typically only fifteen percent (15%) to thirty percent (30%) of the PLC code is associated with the straight sequence control of equipment and the remainder of the PLC code is to provide diagnostic and human machine interface information to operators when the equipment gets into non-normal or non-expected states.

The method instructs the line verification system 22 by the virtual PLC generator based on the PLC code. The method plays a manufacturing line model by the line verification system 22, which is driven by the PLC code generated by the virtual PLC generator to analytically verify the PLC code. The validation is performed by having the virtual PLC generator instruct CAD tooling models associated with the creation of the manufacturing line model that the virtual PLC generator read in. The method then advances to bubble 110 and ends. It should be appreciated that the "handshake" between the line verification system 22 and virtual PLC generator allows for the testing of the actual PLC code, including the diagnostic and human machine interface portion of the PLC code.

In diamond 106, if the manufacturing line model is not good or correct, the method advances to diamond 112 and determines whether a change is required to the engineering source data from the design engineering source 16 such as the fixture design system and/or workcell design system to adjust the fixture/workcell description by the fixture design system and workcell design system. If no change is required, the method advances to block 114 and modifies the manufacturing line analysis model previously described. In block 114, the method modifies the geometry locations and sequence data from the neutral event specification file. The method then advances to block 104 previously described.

In diamond 112, if a change is required, the method advances to block 116 and modifies the engineering source data. In block 116, the method modifies the geometry and tool behavior or motion from the geometry files and motion files, respectively. The method then advances to block 102 previously described.

Accordingly, the present invention uses a neutral event specification to create flexibility in that it does not require the manufacturing tool design technologies to all be using the same CAD engine, as now the event information is transported and described independent of the actual geometric description of the tooling models and does not require the use of intelligent tooling object models. The present invention allows for unlimited scope that manufacturing line models can be defined because of being independent of a specific CAD system. This enables building up of scaleable manufacturing modeling solutions, since the event specification file is a set of interlocked events and multiple event specification files can be brought together, independent of the manufacturing tool design system that created them. This neutral event specification can then be delivered to a workcell modeling system, where robots are then added around the fixture, and the event specification file initially defined by the fixture modeling system is now augmented by the workcell modeling system to account for the robots now having to interact with the fixture and clamps. The scale continues to grow as now several workcell level neutral event specification files are brought together in line modeling technology, VisLine, and once again the event specification files are augmented to reflect line level integration and interaction requirements.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of using a neutral event specification file for manufacturing line analysis, said method comprising the steps of:
    constructing at least one neutral event specification file having a specification format comprising at least one event, wherein each event has a name, description, at least one signal, and at least one action to enable collecting, locating, and event integration of independently defined manufacturing tooling;
    constructing a manufacturing line analysis model using the at least one neutral event specification file, at least one geometry file, and at least one motion file; and
    executing the manufacturing line analysis model using a manufacturing line verification system to verify a manufacturing line.

2. A method as set forth in claim 1 wherein the specification format includes at least one child event.

3. A method as set forth in claim 2 wherein the at least one action includes at least one action block.

4. A method as set forth in claim 3 wherein the at least one action block comprises one from a group comprising a movie action, signal timing action, visibility action, and camera action.

5. A method as set forth in claim 1 wherein the at least one signal comprises a flag.

6. A method as set forth in claim 1 wherein said step of executing the manufacturing line analysis model includes receiving the at least one neutral event specification file, the at least one geometry file, and the at least one motion file.

7. A method as set forth in claim 6 wherein said step of executing includes linking the at least one neutral specification file, the at least one geometry file, and the at least one motion file together to form the manufacturing line analysis model.

8. A method as set forth in claim 6 wherein said step of executing further comprises playing the manufacturing line analysis model by the manufacturing line verification system.

9. A method as set forth in claim 1 wherein the specification format includes at least one dependency.

10. A method as set forth in claim 9 wherein the at least one dependency includes at least one from a group comprising AND, OR, NOT operators.

11. A method as set forth in claim 10 wherein the at least one dependency includes parenthesis for precedence of the operators.

12. A method as set forth in claim 1 wherein the specification format is defined in the order of the name, description, at least one signal, and at least one action.

13. A method as set forth in claim 12 wherein the specification format is further defined to include at least one child event after the at least one action.

14. A method of using a neutral event specification file for manufacturing line analysis, said method comprising the steps of:
    constructing at least one neutral event specification file having a specification format comprising at least one event, wherein each event has a name, description, at least one signal, and at least one action to enable collecting, locating, and event integration of independently defined manufacturing tooling;
    receiving the at least one neutral event specification file, at least one geometry file, and at least one motion file;
    constructing a manufacturing line analysis model using the at least one neutral event specification file, at least one geometry file, and at least one motion file;
    executing the manufacturing line analysis model using a manufacturing line verification system;
    determining by an operator whether an acceptable manufacturing line exists based on the manufacturing line analysis model; and
    using the manufacturing line analysis model to build the manufacturing line if determined that an acceptable manufacturing line exists.

15. A method as set forth in claim 14 including the step of determining whether a change is required to the manufacturing line if determined that an acceptable manufacturing line does not exist.

16. A method as set forth in claim 14 wherein the specification format includes at least one child event.

17. A method as set forth in claim 14 wherein the at least one action includes at least one action block.

18. A method as set forth in claim 17 wherein the at least one action block comprises one from a group comprising a movie action, signal timing action, visibility action, and camera action.

19. A method as set forth in claim 14 wherein said step of executing further comprises playing the manufacturing line analysis model by the manufacturing line verification system.

20. A method of using a neutral event specification file for manufacturing line analysis, said method comprising the steps of:

constructing at least one neutral event specification file having a specification format comprising at least one event, wherein each event has a name, description, at least one signal, and at least one action to enable collecting, locating, and event integration of independently defined manufacturing tooling;

receiving the at least one neutral event specification file, at least one geometry file, and at least one motion file;

constructing a manufacturing line analysis model using the at least one neutral event specification file, at least one geometry file, and at least one motion file; and executing a manufacturing line analysis model using a manufacturing line verification system;

determining by an operator whether an acceptable manufacturing line exists based on the manufacturing line analysis model;

using the manufacturing line analysis model to build the manufacturing line if determined that an acceptable manufacturing line exists;

determining whether a change is required to the manufacturing line if determined that an acceptable manufacturing line does not exist;

modifying the manufacturing line analysis model if a change is not required to the manufacturing line; and modifying the at least one neutral event specification file if a change is required to the manufacturing line.

\* \* \* \* \*